Dec. 12, 1939.  E. WILDHABER  2,183,285
GEAR
Original Filed April 17, 1937  3 Sheets-Sheet 1

Inventor
Ernest Wildhaber
Attorney

Dec. 12, 1939.  E. WILDHABER  2,183,285
GEAR
Original Filed April 17, 1937  3 Sheets-Sheet 2

Inventor
Ernest Wildhaber
B. Schlesinger
Attorney

Dec. 12, 1939.  E. WILDHABER  2,183,285
GEAR
Original Filed April 17, 1937   3 Sheets-Sheet 3

Inventor
Ernest Wildhaber
B. Schlesinger
Attorney

Patented Dec. 12, 1939

2,183,285

UNITED STATES PATENT OFFICE 2,183,285

GEAR

Ernest Wildhaber, Brighton, N. Y., assignor to Gleason Works, Rochester, N. Y., a corporation of New York Original application April 17, 1937, Serial No. 137,532. Divided and this application January 31, 1939, Serial No. 253,830

11 Claims. (Cl. 74—459.5)

The present invention relates to gears and their manufacture and particularly to bevel gears and to tools for and methods of manufacturing such gears. The new tools for and method of producing gears are covered in my pending U. S. application Ser. No. 137,532, filed April 17, 1937. The present application is a division of application Ser. No. 137,532 and is confined to the new form of gear.

One object of the invention is to provide a practical form of longitudinally curved tooth bevel gearing which may be used in differentials, in aeroplane drives, etc. where straight bevel gearing is now employed and where absence of end thrust is a primary consideration, but which, because of its curved teeth, will operate more quietly than straight bevel gearing.

A further object of the invention is to provide a form of longitudinally curved tooth bevel gearing for the purpose described which will operate without appreciable end thrust but which will have the requisite strength to carry the varying loads to which the gearing may be subjected in use.

Another object of the invention is to provide a form of longitudinally curved tooth bevel gearing which will operate without end thrust but which may be cut and ground upon existing spiral bevel gear cutting and grinding machinery by processes similar to and having the speed of production characteristic of methods for cutting and grinding ordinary spiral bevel gears.

Still another object of the invention is to provide an improved form of bevel gearing for the purpose described in which the two members of a pair will mesh with less than full profile bearing and with less than full length tooth contact.

Other objects of the invention will be apparent hereinafter from the specification and from the recital of the appended claims.

Heretofore straight bevel gears have been used exclusively in bevel differential gearing, in bevel gear aeroplane drives and in other places where it is desirable to have a bevel drive which will be substantially free from end thrust. This eliminates the necessity for axial thrust bearings, minimizing the cost, a consideration in a differential, and minimizing the weight, a prime consideration in an aeroplane drive. It is difficult, however, to make straight bevel gears so that they will run together quietly particularly at high speeds. At least one attempt has been made previously, therefore, to cut longitudinally curved tooth bevel gears with teeth of approximately zero spiral angle at a point intermediate the ends of the face of the gear so that the gears would run together with a minimum of end thrust and, at the same time, due to the lengthwise curvature of their teeth operate quietly. This previous effort failed, however, because the gears as made were not practical.

With the present invention, a pair of bevel gears are provided that have longitudinally curved teeth of substantially zero spiral angle at the center of the face and curved on an extremely large radius of curvature; the radius of curvature of the teeth is ordinarily more than twice the face-width of the gears. The gears are cut, moreover, so that the mating tooth surfaces of a pair have a lengthwise mismatch and will have, therefore, a lengthwise localization of tooth bearing. Further, the profiles of the teeth of one or both members of a pair are relieved on the top and flanks of the teeth so that the gears in mesh will have less than full profile bearing. These features of construction make for added quietness in operation and permit the gears to accommodate themselves readily to variations in loads or mountings. The gears are also cut with teeth of tapering depth from one end to the other so that the tooth strength at the small end of the tooth is proportionate to that at the large end of the tooth and the gears can, therefore, carry as heavy loads as ordinary straight toothed bevel gears. Preferably, too, the larger member of a pair is cut with teeth of straight profile in a forming operation, thus making the cost of the gear pairs a minimum.

Figure 1:
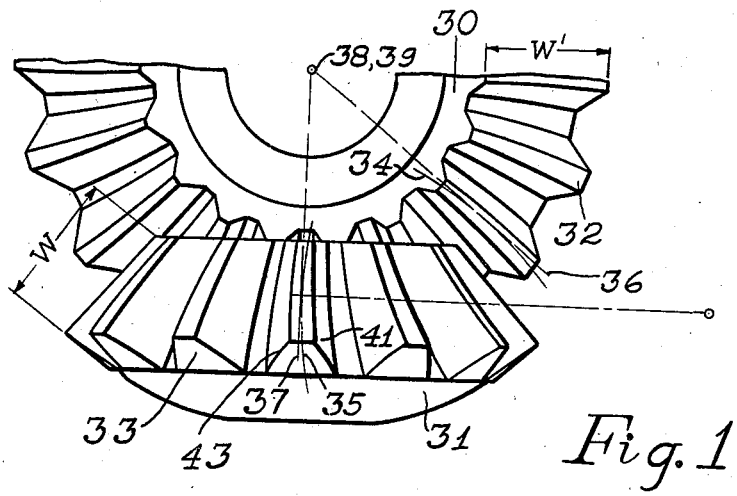
Fig. 1 is a fragmentary plan view and Fig. 2 a side elevation of a pair of gears produced according to this invention.
Figure 2:
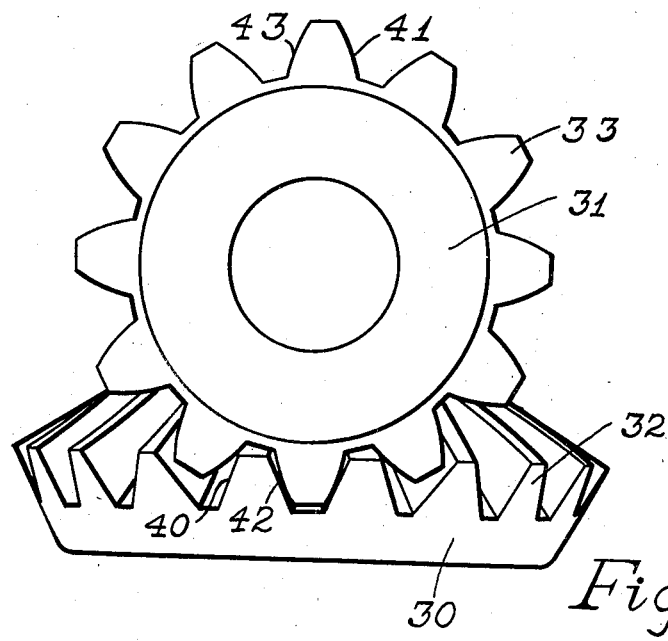

Reference will now be had to the drawings for a more detailed description of the invention. 30 and 31 (Figs. 1 and 2) denote the two members of a pair of bevel gears constructed according to one embodiment of this invention. The two gears have longitudinally curved teeth, 32 and 33, respectively, which are of zero spiral angle at approximately the center of the face of the gears. Thus, as shown in Fig. 1, the line 36, which is radial of the cone center 38 of the gear is tangent to a median line 34 of a tooth 32 of the gear at a point approximately at the center of the tooth face of the gear. Likewise, the median line 35 of a pinion tooth 33 is tangent to a line 37 which is radial of the pinion apex 39, at a point approximately midway of the face of the pinion.

The teeth of both the gear and pinion are curved on very large radii of curvature, the radii of curvature being in all cases more than twice the width of face W or W', respectively, of gear or pinion. The result is, as clearly shown in Figs. 1 and 2, the gears have teeth which for their length of face approximate very closely straight teeth.

Both members of the pair may be generated. Preferably, however, only the pinion is generated and the gear or larger member of the pair is form-cut, that is non-generated. Preferably, it is provided with teeth whose opposite sides 40 and 42 are of straight profile and conical surfaces of revolution.

Figure 4:
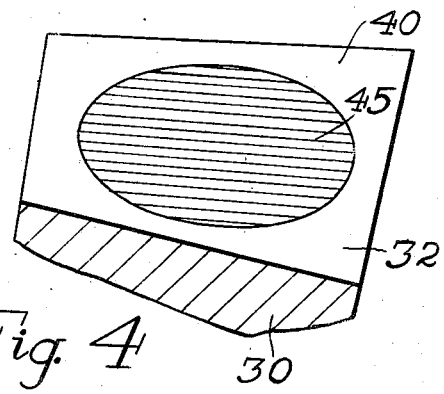
Fig. 4 is a diagrammatic view showing the tooth surface of one member of a pair of gears produced according to this invention and illustrating the localized tooth bearing of the gears when they run in mesh.

The teeth of both the gear and pinion are made to taper in depth from their large to their small ends, as clearly shown in Figs. 4 and 7, and as will be referred to more particularly hereinafter.

Figure 3:
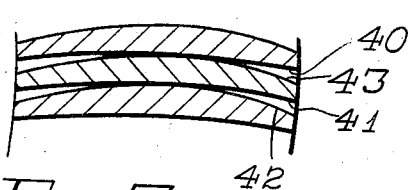
Fig. 3 is a diagrammatic view illustrating the lengthwise mismatch of the mating tooth surfaces of a pair of gears produced according to this invention.

To provide a suitable localization of lengthwise tooth-bearing, the mating tooth surfaces of the two members of the pair are curved along slightly different radii of curvature. Thus, as shown in Fig. 3, which is an enlarged view showing a pinion tooth in mesh with two teeth of the gear and somewhat diagrammatic, the sides 41 of the pinion teeth are of slightly larger radius of curvature than the mating sides 42 of the gear teeth and the sides 43 of the pinion teeth are of slightly smaller radius of curvature than the mating sides 40 of the gear teeth. This mismatch in lengthwise tooth curvature provides a localization of lengthwise tooth bearing, as indicated diagrammatically in Fig. 4 which shows the side 40 of a gear tooth. The tooth bearing or contact between this side of a tooth and the mating tooth surface of the pinion, as indicated by the shaded area 45, does not extend along the full length of the tooth but fades out toward the ends of the tooth. This localization of lengthwise tooth bearing permits the gears to accommodate themselves readily to the variations in load and in mountings which are met with in use.

Figure 6:
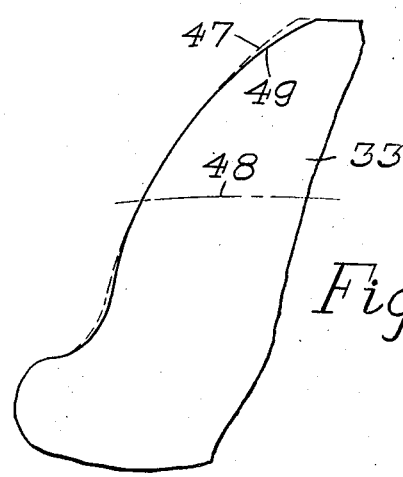
Fig. 6 is a diagrammatic view showing how the profile shape of the pinion tooth is modified by this method of generation.

Further than this, the teeth of the pinion are preferably not made fully conjugate to those of the gear, but are slightly relieved at the tops and bottoms of the tooth flanks to provide a suitable localization of profile bearing. This is clearly shown in Fig. 6 where one of the pinion teeth 33 is illustrated on a greatly enlarged scale. The dotted line 47 denotes the profile of a pinion tooth which is fully conjugate to the teeth of the gear, while the full line 49 indicates the actual profile of a pinion tooth made according to the preferred embodiment of this invention. It will be seen that the actual profile 49 departs from the theoretical profile 47 at the top and bottom of the tooth. This results in a localization of profile bearing, when the pinion runs in mesh with the mate gear, less than full profile bearing being obtained, as shown in Fig. 4. The bearing does not extend to the top or to the bottom of the teeth. This makes for quietness in operation and enhances the advantages inherent in the longitudinally curved tooth construction. In Fig. 6, the line 48 denotes the pitch line of the pinion tooth or a line approximately midway the height of the tooth.

Various methods may be employed for producing the gear or larger member of the pair according to this invention. If both members of the pair are generated, the pair may be produced according to any of the known processes of generating spiral bevel gears, a face-mill gear cutter of large diameter being employed. If the gear has formed tooth profile, it may be cut according to any of the known processes for cutting "Formate", that is, non-generated longitudinally curved tooth gears, a cutter of large diameter being simply employed to produce the requisite lengthwise tooth curvature. The pinion may then be generated conjugate to its mate or, as is preferred and as will be described more fully hereinafter, may be generated conjugate to a gear slightly different from its mate in order to obtain localization of profile bearing.

In cutting the teeth of either gear or pinion, it is desirable to cut the teeth so that the sides and bottoms of the tooth spaces will converge as closely as possible at the gear or pinion apex. This construction gives for any bevel gear a maximum of tooth strength at all points along the length of the teeth.

Figures 7, 8:
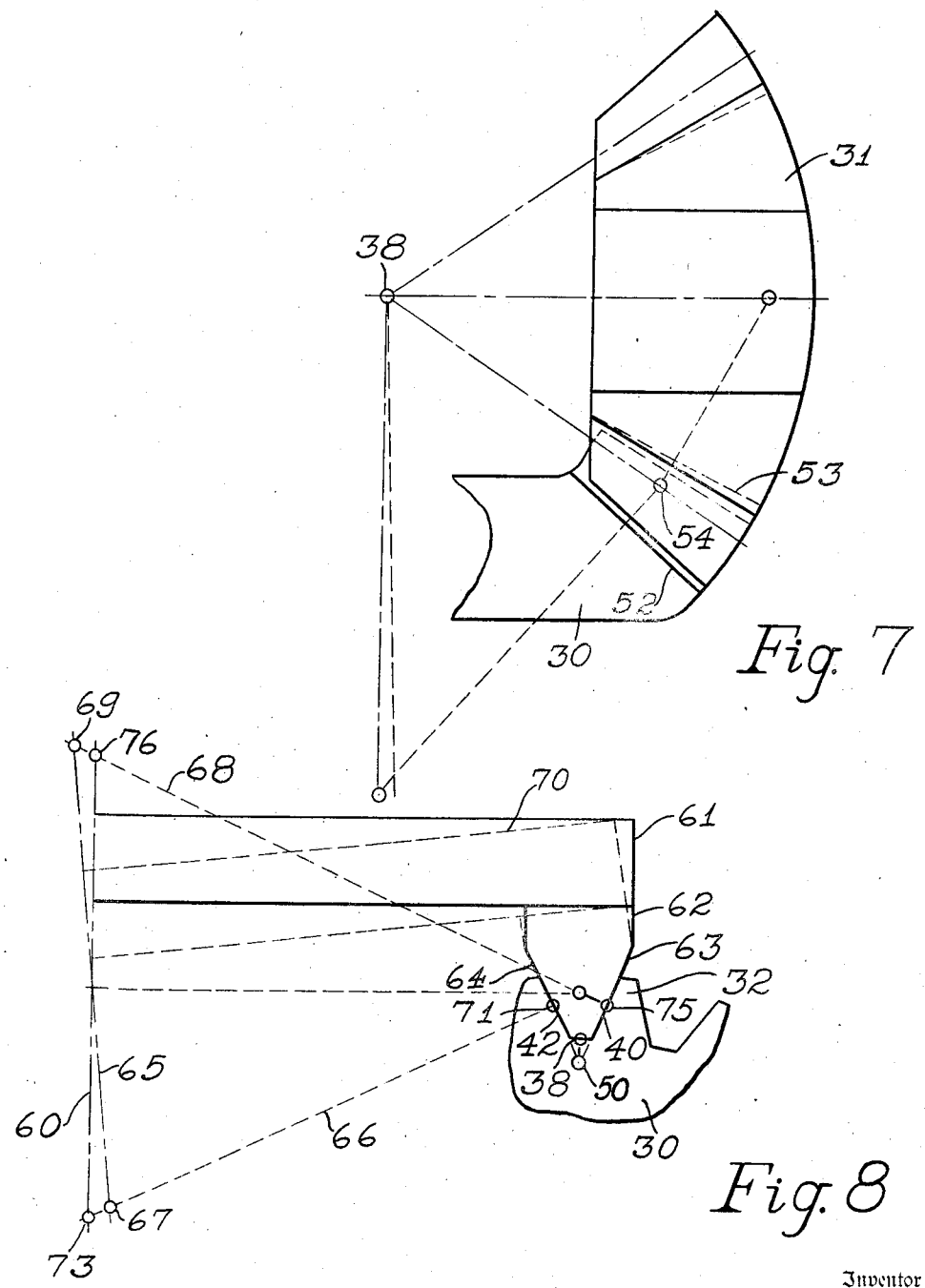
Fig. 7 is a diagrammatic view illustrating certain relationships between the members of a pair of gears produced according to this invention.
Fig. 8 is a diagrammatic view illustrating the preferred method of cutting the gear or larger member of the pair according to this invention.

In Fig. 8, a fragment of the gear 30 is shown. This view is taken along a root cone element of the gear and the apex 38 of the gear appears on the bottom of the tooth space and at a slight distance from the sides 40 and 42 of the space. This distance is a measure of the departure of taper of the tooth space from natural taper, that is, from a taper in which the bottom 52 of the tooth space runs to the cone apex 38. In the gear shown, the straight sides 40 and 42 of a tooth space of the gear intersect, if extended, in a point 50 which does not lie in the tooth bottom but below said bottom.

Natural taper in width of the tooth spaces, or any other taper may be obtained by slightly altering the root angle of the blank, as shown. Such an alteration is indicated for the pinion in Fig. 7 by the dotted line 53 which indicates how the tooth depth of the pinion tooth spaces may be modified to obtain the desired taper. To obtain natural taper in width of the gear teeth, the direction of the cut at a point 54 midway of the face of the gear teeth should be such that the tangent to the line of convergence of the sides of the gear teeth, that is, the tangent at the point 50 will pass through the gear apex 38.

In Fig. 8, 60 denotes the axis of a "single cycle" face-mill gear cutter 61 whose cutting blades or teeth 62 have side-cutting edges 63 and 64 of equal pressure angle, that is, of equal inclination to the axis 60 of the cutter which is positioned so that the axis 60 is at right angles to a plane tangent to the root surface of the gear, as is customary in gear cutting practice. The cutter is of large diameter to produce the desired lengthwise tooth shape on the gear teeth and on account of its large diameter, as compared with the face-width of the gear, would produce a tooth of slight lengthwise curvature; that is, almost straight. Therefore, we would ordinarily obtain hardly any localization of lengthwise tooth bearing.

To obtain a localized lengthwise tooth bearing of any desired length, however, a gear cutter 70 having an axis 65 may be used. This axis intersects the normal 66 to the inside cutter surface in a point 67 and the normal 68 to the outside cutter surface at a point 69. Inasmuch as the normal radius 71—67 of the inside cutter surface is smaller than the radius 71—73 of the cutter 61, the cutter 70 will cut away or relieve the ends of the convex tooth surfaces 42 of the gear, and since the normal radius 75—69 of the outside surface of the cutter 70 is larger than the normal radius 75—76 of the outside surface of the cutter 61, the cutter 70 will also relieve or cut away the tooth ends of the concave surfaces 40 of the gear. Thus, tooth surfaces may be produced on the gear which will have a desired localization of lengthwise tooth bearing when run with the mating tooth surfaces of the pinion.

The cutter 70 has a larger blade angle on the outside and a smaller blade angle on the inside, that is, the outside cutting edges 63 of this cutter have a greater inclination to the axis 65 of the cutter than have the inside cutting edges 64. This is contrary to usual practice for cutting bevel gears since ordinarily a cutter having opposite side cutting edges of equal pressure angle is employed. No additional machine adjustments are required, however, to use a cutter such as shown at 70 to cut spiral bevel gears in a forming, that is non-generating operation.

It is preferred to use the cutter with the different blade pressure angles in cutting the gear rather than the pinion. If a cutter having unequal blade angles were used in a generating process an additional cutter tilt or cutter setting would have to be provided upon the gear generating machine. Hence, it is preferred to make the pinion cutter with opposite side cutting edges of equal pressure angle or inclination to the axis of the cutter.

The pinion 31 may be generated conjugate to the gear 30 by rolling the pinion blank with reference to a cutting tool representing a tooth of the gear, as though the pitch surface of the pinion were rolling on the conical pitch surface of the gear.

If the mating gear has generated tooth surfaces instead of formed tooth surfaces, the pinion teeth are generated by rolling the pinion blank on the pitch surface of an actual or nominal crown gear.

Figure 5:
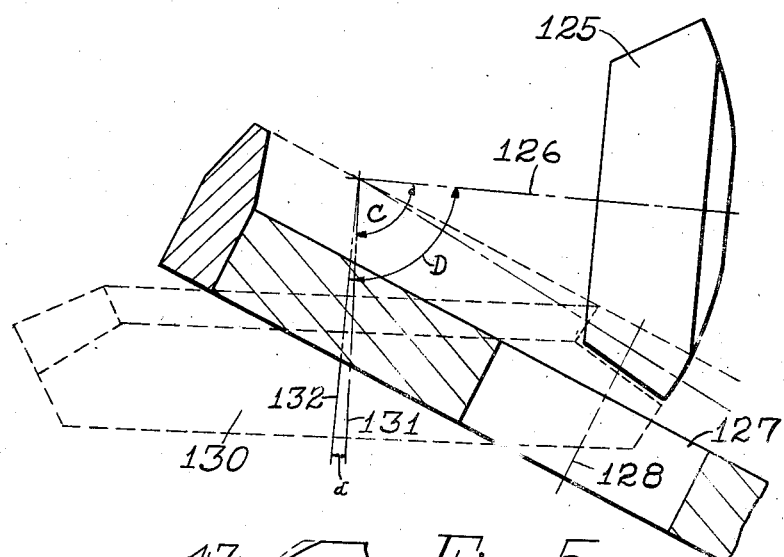
Fig. 5 is a diagrammatic view illustrating the preferred method of generating a pinion according to this invention.

When the gear is form-cut, the pinion is preferably generated conjugate to a basic gear whose axis is inclined at a slightly different angle to the axis of the pinion blank from the angle between the axes of the pinion and its mate gear when the pair are in mesh. This method of generation is illustrated diagrammatically in Fig. 5. The pinion blank to be cut is denoted at 125. Its axis is at 126. The cutter for cutting the pinion teeth is denoted at 127. Its axis is at 128. This cutter is positioned relative to the pinion blank so that it represents a conical gear 130 whose axis 131 is inclined to the axis 126 of the pinion blank at an angle C which is less than the angle D between the axis of the pinion and the axis 132 of its mate gear when the pair are in mesh. The angle $d$ which is the difference between the two angles is ordinarily less than the dedendum angle of the pair. The tooth surfaces of the pinion are generated by rotating the tool on its axis 128 while producing a relative rolling movement between the pinion blank and the tool as though the pinion blank were rolling upon the gear 130 represented by the tool. When the pinion is generated in this way, tooth surfaces will be produced on the pinion which will be relieved on the tops and the bottoms of the tooth profiles, as indicated in Fig. 6.

Where both members of the pair are generated, localization of profile bearing can be obtained by generating the pinion conjugate to a crown gear slightly different from the crown gear to which the mate gear is generated conjugate.

While the invention has been described in connection with different embodiments thereof, it will be understood that the invention is capable of still further modification and this application is intended to cover any variations, uses, or adaptations of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A pair of tapered gears, each of which has teeth tapering in depth from end to end and side surfaces which are curved longitudinally on circular arcs whose radii are more than twice the face-width of the gear, the teeth of each gear having such a longitudinal direction that a line drawn radially of the apex of the gear is tangent to a median line of a tooth at a point between the tooth ends.

2. A pair of bevel gears, each of which has teeth which taper in depth from end to end and side surfaces which are curved longitudinally on circular arcs whose radii are more than twice the face-width of the gear, the teeth of each gear having such a longitudinal direction that a line drawn radial of the apex of the gear is tangent to a median line of a tooth at a point between the tooth ends, one of said gears having side surfaces which are surfaces of revolution and the other gear having side surfaces which are generated conjugate to a surface of revolution.

3. A pair of bevel gears, each of which has teeth which taper in depth from end to end and side surfaces which are curved longitudinally on circular arcs whose radii are more than twice the face-width of the gear, the teeth of each gear having such a longitudinal direction that a line drawn radial of the apex of the gear is tangent to a median line of a tooth at a point between the tooth ends, one of said gears having conical side tooth surfaces and the other gear having side tooth surfaces which are generated conjugate to conical surfaces.

4. A pair of bevel gears, each of which has teeth which taper in depth from end to end and side surfaces which are curved longitudinally on circular arcs whose radii are more than twice the face-width of the gear, the teeth of each gear having such a longitudinal direction that a line drawn radial of the apex of the gear is tangent to a median line of a tooth at a point between the tooth ends, one of said gears having the opposite sides of its tooth spaces formed as coaxial surfaces of revolution having different radii of curvature and the other of said gears having the opposite sides of its tooth spaces generated conjugate to coaxial surfaces of revolution and having different radii of curvature.

5. A pair of bevel gears, each of which has teeth which taper in depth from end to end and have such a longitudinal direction that a line drawn radially of the apex of a gear is tangent to a median line of a tooth at a point between the tooth ends, one of said gears having the sides of its teeth relieved at the top and the bottom of the tooth profile so that its teeth have less than full profile contact with the tooth surfaces of the mate gear when run in mesh with the mate gear.

6. A pair of bevel gears, each of which has teeth tapering in depth from end to end and so curved longitudinally that a line drawn radially of the apex of a gear is tangent to a median line of a tooth at a point between the tooth ends, opposite side tooth surfaces of one gear having slightly different radii of curvature from the mating tooth surfaces of the other gear, and one of said gears having the sides of its teeth relieved at the top and bottom of its tooth profiles so that its teeth have less than full profile contact with the tooth surfaces of the mate gear when the pair are run in mesh.

7. A pair of bevel gears, each of which has teeth tapering in depth from end to end and so curved longitudinally that a line drawn radially of the apex of a gear is tangent to a median line of a tooth at a point between the tooth ends, one of said gears having side tooth surfaces which are surfaces of revolution and the other gear having side tooth surfaces which are generated conjugate to surfaces of revolution, the latter gear having the sides of its teeth relieved at the top and bottoms of the tooth profiles so that its teeth have less than full profile contact with the tooth surfaces of the mate gear when the pair are run in mesh.

8. A pair of tapered gears having tooth spaces one of which has tooth sides which are longitudinally curved and coaxial surfaces of revolution and the other of which has tooth sides that are conjugate to surfaces of revolution, the profile of a concave side of a tooth space of the first gear being more inclined to the common axis of the sides of said tooth space than the profile of a convex side of said tooth space.

9. A tapered gear having tooth spaces whose sides are longitudinally curved and coaxial conical surfaces of revolution, the profile of the concave side of a tooth space being more inclined to the common axis of the sides of a tooth space than the profile of the convex side of the tooth space.

10. A pair of tapered gears, each of which has teeth tapering in depth from end to end and so curved longitudinally that a line drawn radially of the apex of a gear is tangent to the median line of a tooth at a point midway the length of the tooth, one of said gears having coaxial tooth surfaces, and the profile of the concave side of a tooth space of said gear being more inclined to the common axis of said tooth space than the profile of the convex side of said tooth space.

11. A pair of bevel gears, each of which has teeth tapering in depth from end to end and so curved longitudinally that a line drawn radially of the apex of a gear is tangent to a median line of a tooth at a point midway the length of the tooth, one of said gears having side tooth surfaces which are coaxial surfaces of revolution, and the other gear having side tooth surfaces which are generated conjugate to surfaces of revolution, the first gear having the profile of a longitudinally concave side tooth surface more inclined than the profile of a convex side tooth surface to the common axis of said tooth surfaces, and the latter gear having the sides of its teeth relieved at the tops and bottoms of the tooth profiles so that its teeth have less than full profile contact with the tooth surfaces of the first gear when the pair are in mesh.

ERNEST WILDHABER.